United States Patent
Kim et al.

(10) Patent No.: US 10,621,136 B2
(45) Date of Patent: *Apr. 14, 2020

(54) SYSTEM ON CHIP FOR PACKETIZING MULTIPLE BYTES AND DATA PROCESSING SYSTEM INCLUDING THE SAME

(71) Applicant: SAMSUNG ELECTRONICS CO., LTD., Suwon-si, Gyeonggi-Do (KR)

(72) Inventors: Min-Chul Kim, Hwaseong-si (KR); Sang Heon Lee, Seongnam-si (KR); Hyo Chan An, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,040

(22) Filed: Oct. 29, 2018

(65) Prior Publication Data

US 2019/0065430 A1 Feb. 28, 2019

Related U.S. Application Data

(63) Continuation of application No. 14/989,823, filed on Jan. 7, 2016, now Pat. No. 10,114,789.
(Continued)

(30) Foreign Application Priority Data

Mar. 5, 2015 (KR) .................. 10-2015-0031179

(51) Int. Cl.
| | |
|---|---|
| *G06F 13/42* | (2006.01) |
| *G06F 13/40* | (2006.01) |
| *H01R 13/645* | (2006.01) |
| *G06F 13/38* | (2006.01) |
| *H01R 24/58* | (2011.01) |

(52) U.S. Cl.
CPC ...... *G06F 13/4282* (2013.01); *G06F 13/4068* (2013.01); *G06F 13/385* (2013.01); *H01R 13/6456* (2013.01); *H01R 24/58* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | |
|---|---|---|
| 5,293,381 A | 3/1994 | Choy |
| 5,561,807 A | 10/1996 | Verplanken et al. |

(Continued)

FOREIGN PATENT DOCUMENTS

| | | |
|---|---|---|
| KR | 100176622 B1 | 11/1998 |
| KR | 1020050092055 A | 9/2005 |

(Continued)

*Primary Examiner* — Henry Tsai
*Assistant Examiner* — Aurangzeb Hassan
(74) *Attorney, Agent, or Firm* — Volentine, Whitt & Francos, PLLC

(57) ABSTRACT

A system on chip includes a display serial interface (DSI) which includes a PHY protocol interface (PPI) used for communication between a DSI host controller and a D-PHY. The DSI host controller includes a register configured to store first indicator data indicating a PPI packetizing method and a lane distributor configured to determine a size of a symbol to be transmitted to the PPI and an order of first processing units to be included in the symbol based on the first indicator data.

17 Claims, 13 Drawing Sheets

Related U.S. Application Data

(60) Provisional application No. 62/101,007, filed on Jan. 8, 2015.

(56) References Cited

U.S. PATENT DOCUMENTS

| | | |
|---|---|---|
| 5,568,490 A | 10/1996 | McNinch |
| 6,622,187 B1 | 9/2003 | Brune et al. |
| 6,668,297 B1 | 12/2003 | Karr et al. |
| 6,850,523 B1 | 2/2005 | Karr et al. |
| 2005/0071517 A1 | 3/2005 | O'Mahony |
| 2006/0222343 A1 | 10/2006 | Okuyama |
| 2010/0306618 A1 | 12/2010 | Kim et al. |
| 2013/0191569 A1 | 7/2013 | Shacham et al. |
| 2015/0043674 A1 | 2/2015 | Blon et al. |
| 2015/0043691 A1 | 2/2015 | Blon et al. |

FOREIGN PATENT DOCUMENTS

| | | |
|---|---|---|
| KR | 1020110103363 A | 9/2011 |
| KR | 1020120125953 A | 11/2012 |
| KR | 1020140098603 A | 8/2014 |
| WO | 9626589 A1 | 8/1996 |

SYSTEM ON CHIP FOR PACKETIZING MULTIPLE BYTES AND DATA PROCESSING SYSTEM INCLUDING THE SAME

CROSS-REFERENCE TO RELATED APPLICATION

This is a Continuation of U.S. application Ser. No. 14/989,823, filed Jan. 7, 2016, which claims priority under 35 U.S.C. § 119(e) to U.S. provisional patent application No. 62/101,007 filed on Jan. 8, 2015, and under 35 U.S.C. § 119(a) to Korean Patent Application No. 10-2015-0031179 filed on Mar. 5, 2015, the entire contents of each of which are hereby incorporated by reference.

BACKGROUND

Embodiments of the disclosure relate to a system on chip (SoC), and more particularly, to a SoC for packetizing a symbol including multiple bytes using indicator data indicating a PHY protocol interface (PPI) packetizing method and a data processing system including the same.

As the resolution of a display increases, a display controller transmitting data to the display needs to increase the transmission speed of the data. A display interface standard, mobile industry processor interface (MIPI) display serial interface (DSI), includes a DSI host controller and a D-PHY. When the frequency of a clock signal used between the DSI host controller and the D-PHY increases, power consumption of the DSI also increases.

Timing closure is getting more difficult during DSI manufacturing. Timing closure is a process of modifying a field-programmable gate array (FPGA) or very large-scale integration (VSLI) design to satisfy FPGA or VLSI timing requirements. Most of modifications are processed by electronic design automation (EDA) tools according to instructions given by a designer.

When a host controller of a DSI transmits image data byte by byte to a D-PHY, the D-PHY serializes the image data and transmits the serialized image data to a display driver integrated circuit (IC). When the frequency of a clock signal of the D-PHY of the DSI is increased to process high-resolution image data as the resolution of a display increases, timing closure becomes difficult and the power consumption of the DSI increases.

SUMMARY

According to some embodiments of the disclosure, there is provided a system on chip including a display serial interface (DSI) which includes a PHY protocol interface (PPI) used for communication between a DSI host controller and a D-PHY. The DSI host controller may include a register configured to store first indicator data indicating a PPI packetizing method and a lane distributor configured to determine a size of a symbol to be transmitted to the PPI and an order of first processing units to be included in the symbol based on the first indicator data.

The lane distributor may receive a data packet including second processing units and generate the symbol including the first processing units by distributing the second processing units using a PPI processing unit J, the number M of lanes connected to the D-PHY, a transmission order N of the symbol, and a number L given to a lane through which the symbol is transmitted among the lanes connected to the first D-PHY which are included in the first indicator data.

The PPI processing unit J may indicate a PPI data width. A size of each of the second processing unit may be 1 byte. The lane distributor may packetize the symbol including the first processing units.

When the number of the first processing units is 2, the lane distributor may packetize the symbol in order of {BYTE((J*M)*N+L+M), BYTE((J*M)*N+L)}. BYTE((J*M)*N+L+M) and BYTE((J*M)*N+L) may respectively indicate places of the first processing units included in the data packet.

When the number of the first processing units is 3, the lane distributor may packetize the symbol in order of {BYTE((J*M)*N+L+2M), BYTE((J*M)*N+L+M), BYTE((J*M)*N+L)}. BYTE((J*M)*N+L+2M), BYTE((J*M)*N+L+M), and BYTE((J*M)*N+L) may respectively indicate places of the first processing units included in the data packet.

When the first processing units are a part of second processing units included in a data packet, the lane distributor may control an activation period of an indicator signal, which indicates that data including the symbol to be transmitted to the D-PHY is valid, in response to second indicator data indicating the number of the second processing units.

The lane distributor may generate the indicator signal having a first activation period when the number of the second processing units is an even number and may generate the indicator signal having a second activation period when the number of the second processing units is an odd number. The lane distributor may set the first activation period to be longer than the second activation period.

According to other embodiments of the disclosure, there is provided a data processing system including an application processor including a first DSI which includes a first PPI used for communication between a DSI host controller and a D-PHY and a display driver integrated circuit (IC) including a second DSI which includes a second PPI used for communication between a DSI device controller and a second D-PHY. The DSI host controller may include a register configured to store first indicator data indicating a PPI packetizing method and a lane distributor configured to determine a size of a symbol to be transmitted to the first PPI and an order of first processing units to be included in the symbol based on the first indicator data. A data width of the first PPI may be different from a data width of the second PPI. The data width of the first PPI may be greater than the data width of the second PPI.

According to other embodiments of the disclosure, there is provided a display serial interface (DSI) that includes a register that receives and stores information identifying a predetermined packetizing method. A processor receives a packet comprising data units, assigns multiple ones of the data units to each of multiple symbols according to the identified predetermined packetizing method, distributes the symbols among multiple channels according to the identified predetermined packetizing method, and communicates the distributed symbols through the channels.

The DSI may further include a serializer that, for each channel, receives one of the symbols communicated through the channel, removes the data units from the one symbol, arranges the data units removed from the one symbol in a serial sequence, and communicates the serial sequence of the data units through a communication lane corresponding to the channel.

When each of the data units is a byte and the number of data units assigned to each symbol is 2, the processor packetizes the data units within each of the symbols in the order of {BYTE((2*M)*N+L+M), BYTE((2*M)*N+L)}, where BYTE(X) indicates the $X^{th}$ data unit in the received packet, M identifies the number of channels, N identifies an index value within a transmission order of the symbols, and L identifies the channel to which the symbol will be distributed.

When each of the data units is a byte and the number of data units assigned to each symbol is 3, the processor packetizes the data units within each of the symbols in the order of {BYTE((3*M)*N+L+2M), BYTE((3*M)*N+L+M), BYTE((3*M)*N+L)}, where BYTE(X) indicates the $X^{th}$ data unit in the received packet, M identifies the number of channels, N identifies an index value within a transmission order of the symbols, and L identifies the channel to which the symbol will be distributed.

The processor may generate, for each symbol communicated through any one of the channels, an indicator signal that is communicated in synchronization with the symbol. One state of the indicator signal may indicate that the symbol comprises an even number of data units, and another state of the indicator signal may indicate the symbol comprises an odd number of data units.

BRIEF DESCRIPTION OF THE DRAWINGS

The above and other features and advantages of the disclosure will become more apparent by describing, in detail, exemplary embodiments thereof with reference to the attached drawings in which.

DETAILED DESCRIPTION OF THE EMBODIMENTS

Figure 1:
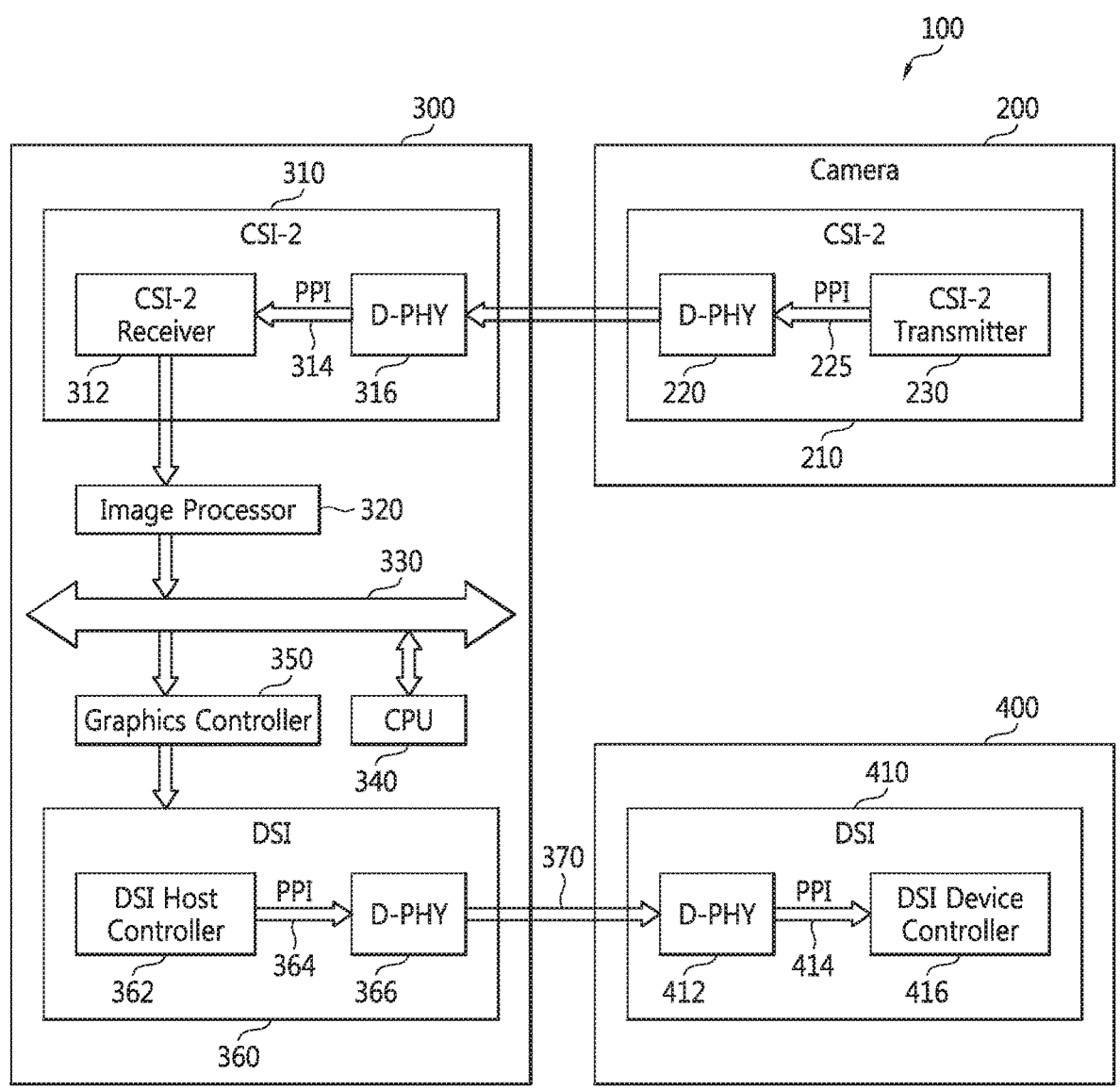
FIG. 1 is a block diagram of a data processing system according to some embodiments of the disclosure.

The disclosure now will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100 according to some embodiments of the disclosure. Referring to FIG. 1, The data processing system 100 may include a camera 200, a controller 300, and a display driver integrated circuit (IC) (DDI) 400. The data processing system 100 may process image data and may be implemented as a mobile computing device, such as a laptop computer, a cellular phone, a smart phone, a table personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book.

The camera 200 may capture or shoot an object to generate first image data and may transmit the first image data to the controller 300 through a camera serial interface-2 (CSI-2) 210. The CSI-2 210 may include a CSI-2 transmitter 230 and a physical interface (PHY) known as a D-PHY 220. The CSI-2 transmitter 230 may communicate with the D-PHY 220 through a PHY protocol interface (PPI) 225. The camera 200 may refer to a camera module including a complementary metal oxide semiconductor (CMOS) image sensor chip.

The controller 300 may control the camera 200 and the DDI 400. The controller 300 may be implemented as an IC, a system on chip (SoC), an application processor (AP), or a mobile AP, but the disclosure is not restricted to these examples. The controller 300 may be implemented as a semiconductor package including an IC, an SoC, an AP, or a mobile AP in other embodiments. The controller 300 may include a CSI-2 310, an image processor 320, a bus 330, a central processing unit (CPU) 340, a graphics controller 350, and a first display serial interface (DSI) 360.

The CSI-2 310 may receive and process first image data from the CSI-2 210 of the camera 200 and may transmit processed image data to the image processor 320. The CSI-2 310 may include a D-PHY 316, a PPI 314, and a CSI-2 receiver 312. The image processor 320 may refer to an image signal processor (ISP). The image processor 320 may convert the format of image data processed by the CSI-2 310 and may output second image data in a changed format to the bus 330.

The first image data (or image data processed by the CSI-2 310) may have a Bayer pattern and the second image data may be in an RGB format, a YUV format, or a YCbCr format. In some embodiments, the first image data (or image data processed by the CSI-2 310) may be in the RGB format and the second image data may be in either the YUV format or the YCbCr format. However, the formats of the first image data and the second image data are not restricted to those examples.

The CPU 340 may control the overall operation of the controller 300. The CPU 340 may control the CSI-2 310, the image processor 320, the graphics controller 350, and the first DSI 360 via the bus 330. The CPU 340 may generate first indicator data for controlling a PPI packetizing method of a DSI host controller 362 and/or second indicator data indicating the number of units of processing (hereinafter, referred to as "processing units") included in a data packet.

The graphics controller 350 may process the second image data output from the image processor 320 and may transmit third image data generated as a process result to the first DSI 360. The graphics controller 350 may be a graphics processing unit (GPU) which processes two-dimensional image data or three-dimensional image data. The third image data may be a data stream or a data packet.

The first DSI 360 may be the one defined in mobile industry processor interface (MIPI) standards, but the disclosure is not restricted to MIPI DSI. The disclosure of the MIPI alliance standard for DSI and CSI-2 published by the MIPI alliance (http://mipi.org) is hereby incorporated by reference.

The first DSI 360 may include the DSI host controller 362, a first PPI 364, and a first D-PHY 366. The data width of the first PPI 364 may be different from that of a second PPI 414 of a second DSI 410 included in the DDI 400. In other words, the first PPI 364 and the second PPI 414 have an asymmetrical structure. The DSI host controller 362 may receive a data packet including second processing units, may determine the size of each of symbols to be transmitted to the first PPI 364 based on the first indicator data indicating a PPI packetizing method, and may determine an order of first processing units to be included in the each of the symbols.

The first processing units may be a part of the second processing units. The size of each of the first processing units and the size of each of the second processing units may be one byte, but the disclosure is not restricted to the current embodiments.

The first DSI 360 of the controller 300 may communicate with the second DSI 410 of the DDI 400 via an interface 370. The interface 370 may include a plurality of lanes.

The DDI 400 may include the second DSI 410, which may include a second D-PHY 412, the second PPI 414, and a DSI device controller 416. The DDI 400 may be included in a display device or a display module.

Figure 2:
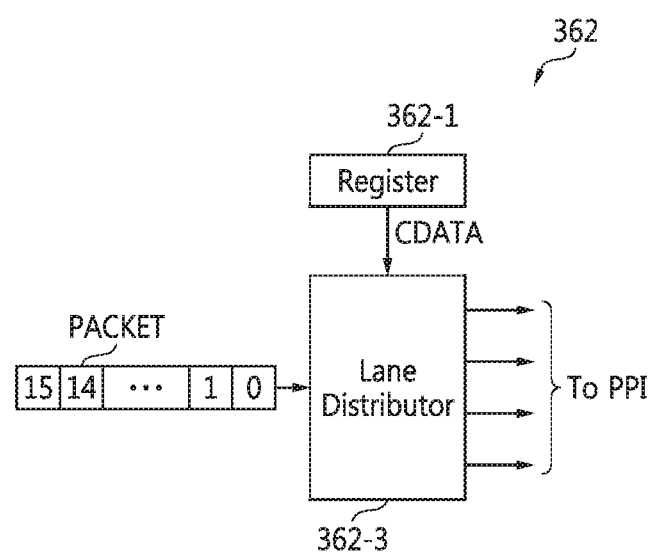
FIG. 2 is a block diagram of a display serial interface (DSI) host controller illustrated in FIG. 1 according to some embodiments of the disclosure.

FIG. 2 is a block diagram of the DSI host controller 362 illustrated in FIG. 1 according to some embodiments of the disclosure. Referring to FIGS. 1 and 2, the DSI host controller 362 may include a register SFR 362-1 and a lane distributor 362-3.

The register 362-1 may store first indicator data CDATA indicating a PPI packetizing method. The register 362-1 may be implemented as a special function register (SFR) but is not restricted thereto. The CPU 340 may set or program the first indicator data CDATA in the register 362-1.

The lane distributor 362-3 may determine the size of each of symbols to be transmitted to the first PPI 364 and an order of first processing units to be included in the symbol based on the first indicator data CDATA. The lane distributor 362-3 may determine the order of first processing units to be included in the each of the symbols using a data packet including second processing units 0 through 15 and the first indicator data CDATA.

Figure 3:
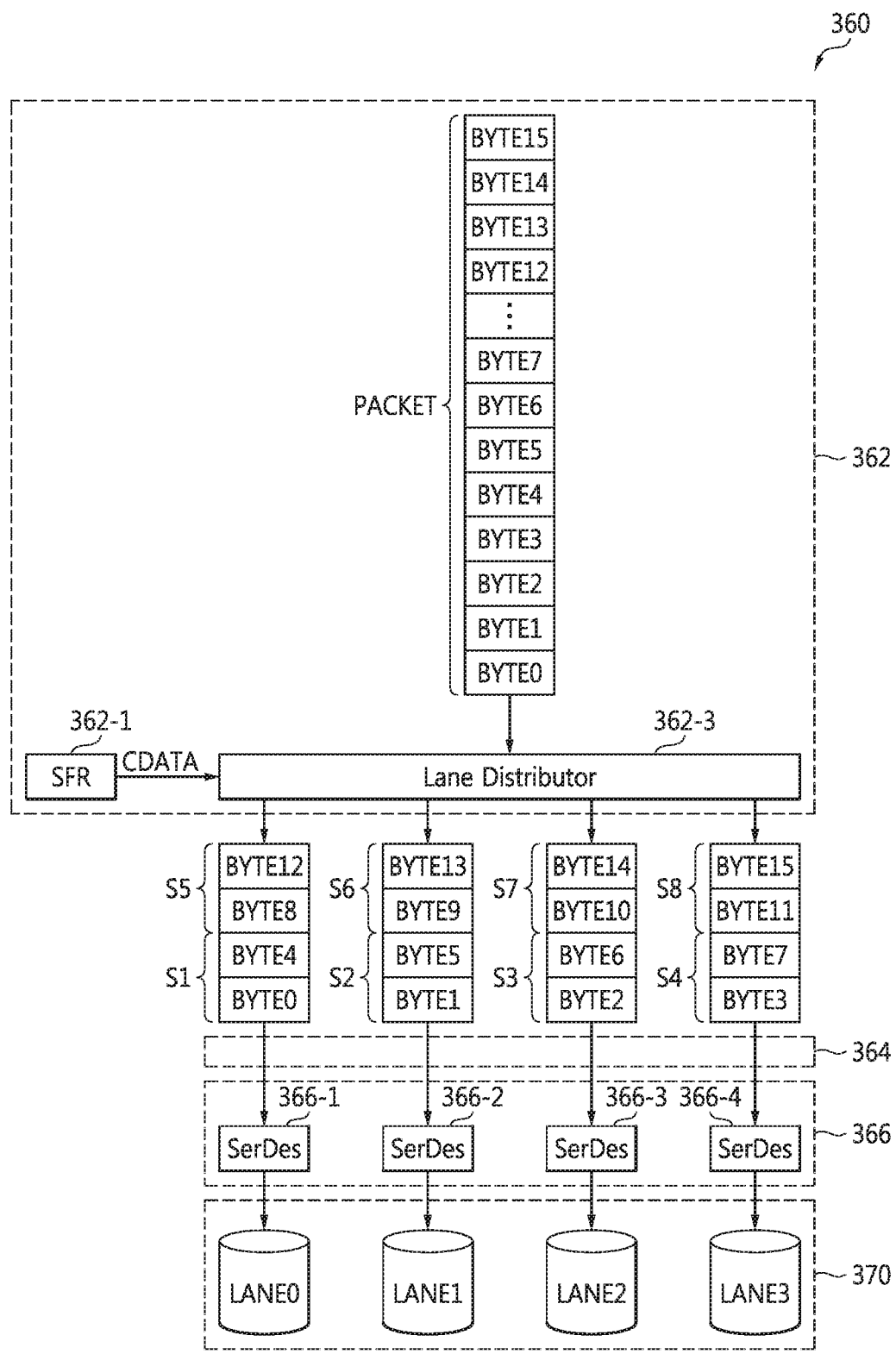
FIG. 3 is a conceptual diagram of the operation of a first DSI of a controller illustrated in FIG. 1 according to some embodiments of the disclosure.
Figure 5:
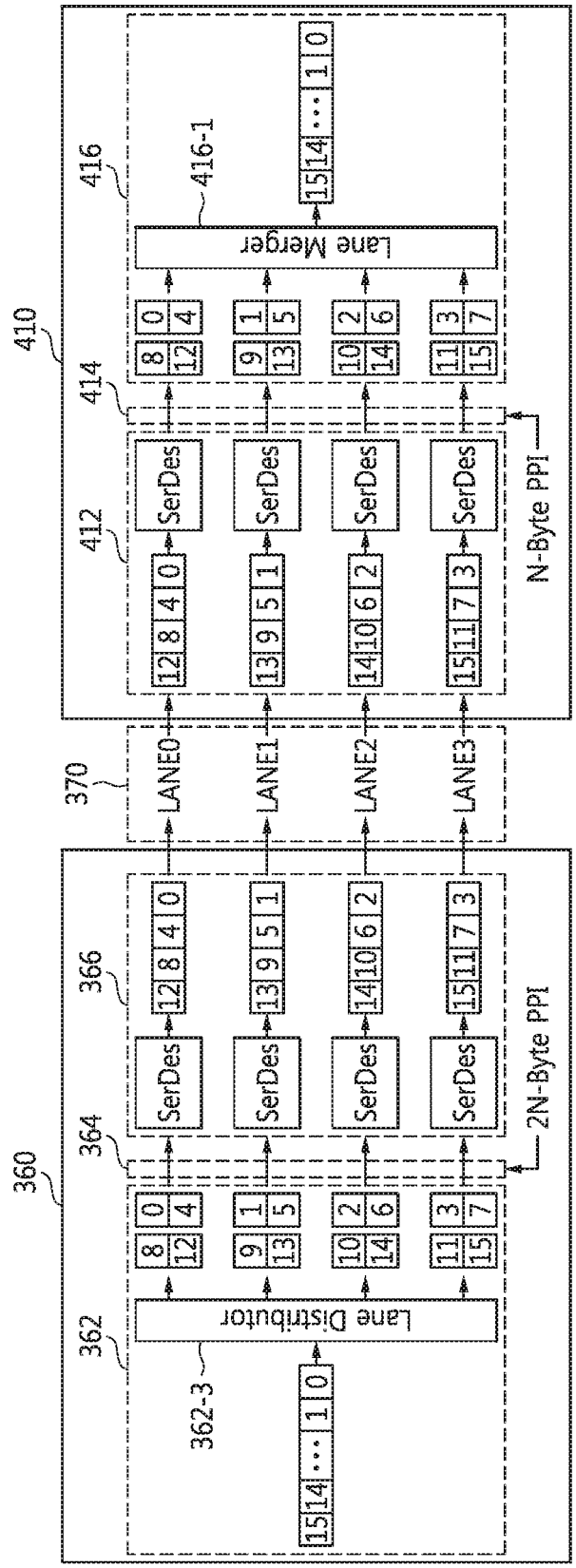
FIG. 5 is a conceptual diagram of the operations of the first DSI and the second DSI respectively included in the controller and the display driver IC illustrated in FIG. 1 according to some embodiments of the disclosure.

FIG. 3 is a conceptual diagram of the operation of the first DSI 360 of the controller 300 illustrated in FIG. 1 according to some embodiments of the disclosure. FIG. 5 is a conceptual diagram of the operations of the first DSI 360 and the second DSI 410 respectively included in the controller 300 and the DDI 400 illustrated in FIG. 1 according to some embodiments of the disclosure. Referring to FIGS. 1 through 3 and FIG. 5, the lane distributor 362-3 may receive a data packet including second processing units BYTE0 through BYTE15 and the first indicator data CDATA. It is assumed that each of the second processing units BYTE0 through BYTE15 is data having a 1-byte size. The second processing units BYTE0 through BYTE15 may be simply presented as "0 through 15".

When the first PPI 364 processes (e.g., packetizes) a symbol by J-byte PPI data width or J-byte PPI processing units, the lane distributor 362-3 may packetize processing units distributed according to Equation 1:

$$\{BYTE((J*M)*N+L+M), BYTE((J*M)*N+L)\}, \quad (1)$$

where J is a PPI processing unit and may be a natural number of at least 1, M is the number of lanes connected to the first D-PHY 366 and may be a natural number of at least 1, N is a transmission order of a packetized symbol and may be 0, 1, 2, . . . , and L is a number given to a lane through which the symbol is transmitted among the lanes connected to the first D-PHY 366. At this time, it is assumed that N for a symbol transmitted first is "0".

The first indicator data CDATA may include data (or information) about J, M, N, and L. When J is 2 and M is 4, the lane distributor 362-3 may determine the number of bytes to be included in each of symbols S1 through S8 using Equation 1. At this time, it is assumed that N for the symbols S1 through S4 is 0 and N for the symbols S5 and S8 is 1.

The lane distributor 362-3 may determine (or distribute) two bytes BYTE0 and BYTE4 to be included in the first symbol S1 to be sent toward a first lane LANE0 (i.e., L=0) in a 0th transmission (i.e., N=0) using Equation 1. In other words, the first symbol S1 may include the byte BYTE0 (=BYTE((2*4)*0+0)) and the byte BYTE4 (=BYTE((2*4)*0+0+4)). Consequently, two bytes BYTE0 and BYTE4 are packetized into the first symbol S1.

The lane distributor 362-3 may determine (or distribute) two bytes BYTE1 and BYTE5 to be included in the second symbol S2 to be sent toward a second lane LANE1 (i.e., L=1) in the 0th transmission (i.e., N=0) using Equation 1. In other words, the second symbol S2 may include the byte BYTE1 (=BYTE((2*4)*0+1)) and the byte BYTE5 (=BYTE((2*4)*0+1+4)). Consequently, two bytes BYTE1 and BYTE5 are packetized into the second symbol S2.

The lane distributor 362-3 may determine (or distribute) two bytes BYTE2 and BYTE6 to be included in the third symbol S3 to be sent toward a third lane LANE2 (i.e., L=2) in the 0th transmission (i.e., N=0) using Equation 1. In other words, the third symbol S3 may include the byte BYTE2 (=BYTE((2*4)*0+2)) and the byte BYTE6 (=BYTE((2*4)*0+2+4)). Consequently, two bytes BYTE2 and BYTE6 are packetized into the third symbol S3.

The lane distributor 362-3 may determine (or distribute) two bytes BYTE3 and BYTE7 to be included in the fourth symbol S4 to be sent toward a fourth lane LANES (i.e., L=3) in the 0th transmission (i.e., N=0) using Equation 1. In other words, the fourth symbol S4 may include the byte BYTE1 (=BYTE((2*4)*0+3)) and the byte BYTE7 (=BYTE((2*4)*0+3+4)). Consequently, two bytes BYTE3 and BYTE7 are packetized into the fourth symbol S4.

The lane distributor 362-3 may determine two bytes BYTE8 and BYTE12 to be included in the fifth symbol S5 to be sent toward the first lane LANE0 (i.e., L=0) in a first transmission (i.e., N=1) using Equation 1. In other words, the fifth symbol S5 may include the byte BYTE8 (=BYTE((2*4)*1+0)) and the byte BYTE12 (=BYTE((2*4)*1+0+4)). Consequently, two bytes BYTE8 and BYTE12 are packetized into the fifth symbol S5.

In the same manner as or a similar manner to that described above, the lane distributor 362-3 may determine (or distribute) two-byte pairs BYTE9 and BYTE13, BYTE10 and BYTE14, and BYTE11 and BYTE15 to be respectively included in the symbols S6, S7, and S8 to be sent toward the lanes LANE1, LANE2, and LANES, respectively, in the first transmission (i.e., N=1). Consequently, two bytes BYTE9 and BYTE13 are packetized into the sixth symbol S6, two bytes BYTE10 and BYTE14 are packetized into the seventh symbol S7, and two bytes BYTE11 and BYTE15 are packetized into the eighth symbol S8.

Referring to FIGS. 3 and 5, each of the symbols S1 and S5 is transmitted in a 2-byte PPI processing unit to a first serializer/deserializer (SerDes) 366-1 of the first D-PHY 366 through the first PPI 364. The first SerDes 366-1 serializes the bytes of symbols S1 and S5 and transmits the serialized bytes of the symbols to the first lane LANE0. As shown in FIG. 5, the serialized bytes BYTE0, BYTE4, BYTE8, and BYTE12 may be transmitted to the second DSI 410 through the first lane LANE0.

Each of the symbols S2 and S6 is transmitted in a 2-byte PPI processing unit to a second SerDes 366-2 of the first D-PHY 366 through the first PPI 364. The second SerDes 366-2 serializes the bytes of the symbols S2 and S6 and transmits the serialized bytes of the symbols to the second lane LANE1. As shown in FIG. 5, the serialized bytes BYTE1, BYTE5, BYTE9, and BYTE13 may be transmitted to the second DSI 410 through the second lane LANE1.

Each of the symbols S3 and S7 is transmitted in a 2-byte PPI processing unit to a third SerDes 366-3 of the first D-PHY 366 through the first PPI 364. The third SerDes 366-3 serializes the bytes of the symbols S3 and S7 and transmits the serialized bytes of the symbols to the third lane LANE2. As shown in FIG. 5, the serialized bytes BYTE2, BYTE6, BYTE10, and BYTE14 may be transmitted to the second DSI 410 through the third lane LANE2.

Each of the symbols S4 and S8 is transmitted in a 2-byte PPI processing unit to a fourth SerDes 366-4 of the first D-PHY 366 through the first PPI 364. The fourth SerDes 366-4 serializes the bytes of symbols S4 and S8 and transmits the serialized bytes of the symbols to the fourth lane LANE3. As shown in FIG. 5, the serialized bytes BYTE3, BYTE7, BYTE11, and BYTE15 may be transmitted to the second DSI 410 through the fourth lane LANE3.

The lane distributor 362-3 may distribute the bytes BYTE0 through BYTE15 to the first through fourth lanes LANE0 through LANE3 using round-robin.

Figure 4:
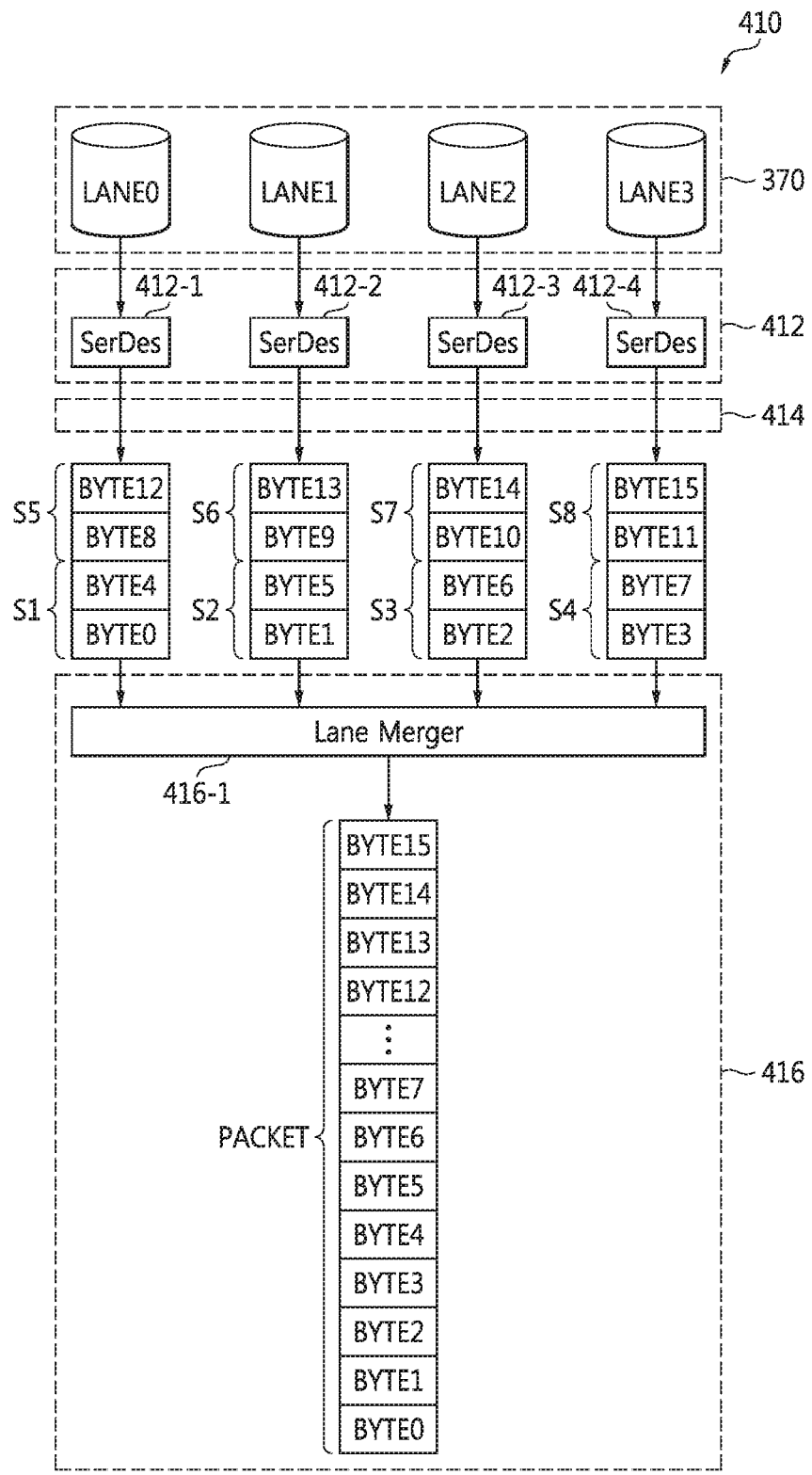
FIG. 4 is a conceptual diagram of the operation of a second DSI of a display driver integrated circuit (IC) illustrated in FIG. 1 according to some embodiments of the disclosure.

FIG. 4 is a conceptual diagram of the operation of the second DSI 410 of the DDI 400 illustrated in FIG. 1 according to some embodiments of the disclosure. Referring to FIGS. 4 and 5, a fifth SerDes 412-1 may deserialize the serialized bytes BYTE0, BYTE4, BYTE8, and BYTE12 received through the first lane LANE0 and may output the symbols S1 and S5 to a lane merger 416-1 through the second PPI 414.

A sixth SerDes 412-2 may deserialize the serialized bytes BYTE1, BYTE5, BYTE9, and BYTE13 received through the second lane LANE1 and may output the symbols S2 and S6 to the lane merger 416-1 through the second PPI 414. A seventh SerDes 412-3 may deserialize the serialized bytes BYTE2, BYTE6, BYTE10, and BYTE14 received through the third lane LANE2 and may output the symbols S3 and S7 to the lane merger 416-1 through the second PPI 414. An eighth SerDes 412-4 may deserialize the serialized bytes BYTE3, BYTE7, BYTE11, and BYTE15 received through the fourth lane LANE3 and may output the symbols S4 and S8 to the lane merger 416-1 through the second PPI 414.

The lane merger 416-1 may perform a merging operation on bytes respectively received from the lanes LANE0 through LANE3. Referring to FIGS. 3 and 5, the order of the processing units BYTE0 through BYTE15 included in a data packet input to the first DSI 360 of the controller 300 is the same as the order of the processing units BYTE0 through BYTE15 included in a data packet output from the second DSI 410 of the DDI 400.

Therefore, even though the data width of the first PPI 364 of the first DSI 360 included in the controller 300 is different from that of the second PPI 414 of the second DSI 410 included in the DDI 400, that is, even though the PPIs 364 and 414 are asymmetrical; the second DSI 410 of the DDI 400 is able to exactly restore the data packet transmitted from the first DSI 360 of the controller 300. In other words, the first DSI 360 of the controller 300 is backward compatible with a legacy device, i.e., the second DSI 410 of the DDI 400.

Figure 6:
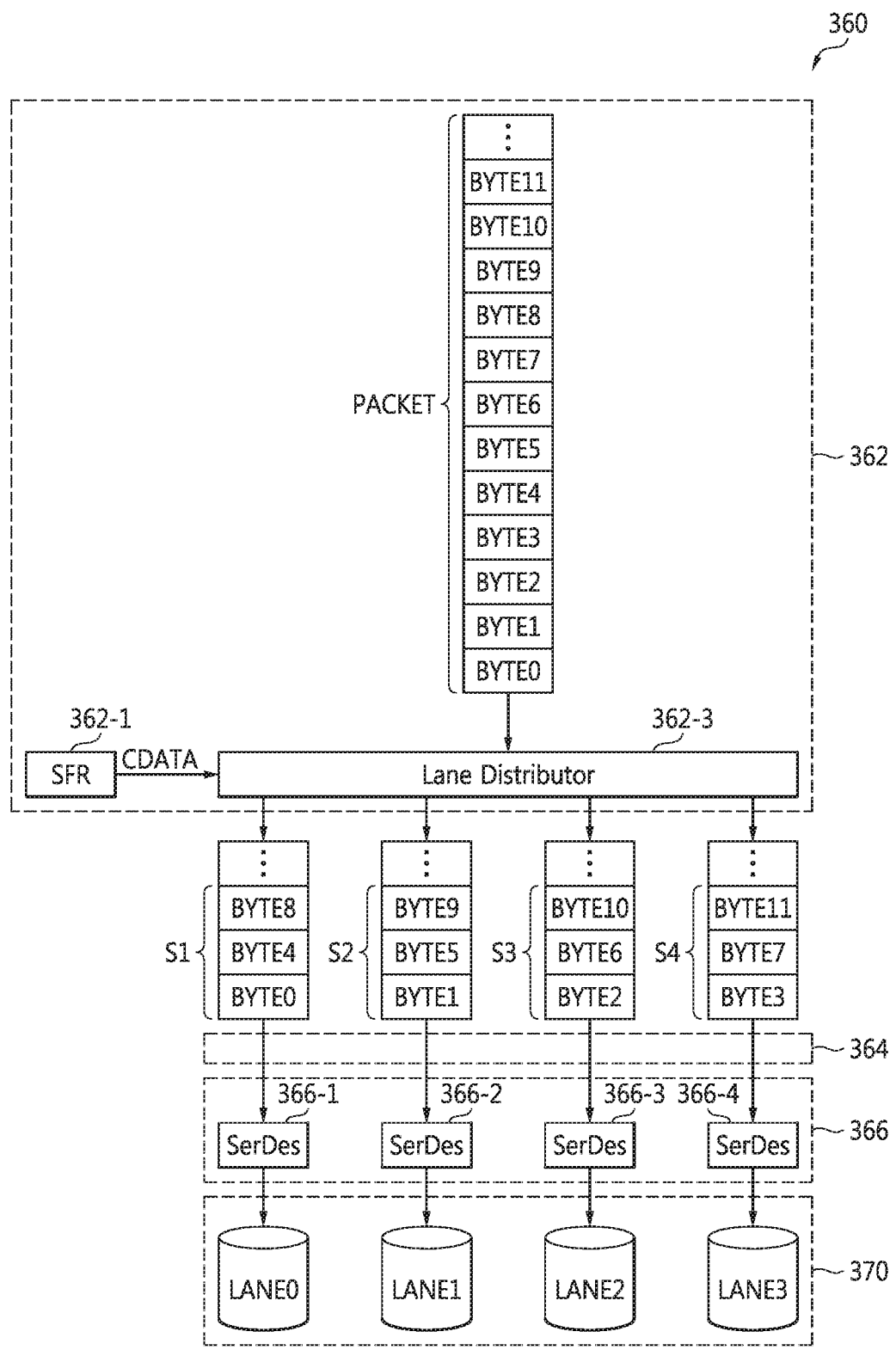
FIG. 6 is a conceptual diagram of the operation of the first DSI of the controller illustrated in FIG. 1 according to other embodiments of the disclosure.

FIG. 6 is a conceptual diagram of the operation of the first DSI 360 of the controller 300 illustrated in FIG. 1 according to other embodiments of the disclosure. Referring to FIGS. 2 and 6, the lane distributor 362-3 may receive a data packet including the second processing units BYTE0 through BYTE15 and the first indicator data CDATA. It is assumed that each of the second processing units BYTE0 through BYTE15 is data having a 1-byte size.

When the first PPI 364 processes (e.g., packetizes) a symbol by J-byte PPI data width or J-byte PPI processing units, the lane distributor 362-3 may packetize processing units distributed according to Equation 2:

$$\{BYTE((J*M)*N+L+2M), BYTE((J*M)*N+L+M), BYTE((J*M)*N+L)\}. \quad (2)$$

The first indicator data CDATA may include data about J, M, N, and L. When J is 3 and M is 4, the lane distributor 362-3 may determine the number of bytes to be included in each of the symbols S1 through S4 using Equation 2. At this time, it is assumed that N for the symbols S1 through S4 is 0.

The lane distributor 362-3 may determine (or distribute) three bytes BYTE0, BYTE4, and BYTE8 to be included in the first symbol S1 to be sent toward the first lane LANE0 (i.e., L=0) in a 0th transmission (i.e., N=0) using Equation 2. In other words, the first symbol S1 includes the byte BYTE0 (=BYTE((3*4)*0+0)), the byte BYTE4 (=BYTE((3*4)*0+0+4)), and the byte BYTE8 (=BYTE((3*4)*0+0+2*4)). Consequently, three bytes BYTE0, BYTE4, and BYTE8 are packetized into the first symbol S1.

The lane distributor 362-3 may determine three bytes BYTE1, BYTE5, and BYTE9 to be included in the second symbol S2 to be sent toward the second lane LANE1 (i.e., L=1) in the 0th transmission (i.e., N=0) using Equation 2. In other words, the second symbol S2 includes the byte BYTE1 (=BYTE((3*4)*0+1)), the byte BYTE5 (=BYTE((3*4)*0+1+4)), and the byte BYTE9 (=BYTE((3*4)*0+1+2*4)). Consequently, three bytes BYTE1, BYTE5, and BYTE9 are packetized into the second symbol S2.

The lane distributor 362-3 may determine three bytes BYTE2, BYTE6, and BYTE10 to be included in the third symbol S3 to be sent toward the third lane LANE2 (i.e., L=2) in the 0th transmission (i.e., N=0) using Equation 2. In other words, the third symbol S3 includes the byte BYTE2 (=BYTE((3*4)*0+2)), the byte BYTE6 (=BYTE((3*4)*0+2+4)), and the byte BYTE10 (=BYTE((3*4)*0+2+2*4)). Consequently, three bytes BYTE2, BYTE6, and BYTE10 are packetized into the third symbol S3.

The lane distributor 362-3 may determine three bytes BYTE3, BYTE7, and BYTE11 to be included in the fourth symbol S4 to be sent toward the fourth lane LANES (i.e., L=3) in the 0th transmission (i.e., N=0) using Equation 2. In other words, the fourth symbol S4 includes the byte BYTE3 (=BYTE((3*4)*0+3)), the byte BYTE7 (=BYTE((3*4)*0+3+4)), and the byte BYTE11 (=BYTE((3*4)*0+3+2*4)). Consequently, three bytes BYTE3, BYTE7, and BYTE11 are packetized into the fourth symbol S4.

Referring to FIG. 6, the first symbol S1 is transmitted in a 3-byte PPI processing unit to the first SerDes 366-1 of the first D-PHY 366 through the first PPI 364. The first SerDes 366-1 serializes the data of the first symbol S1 and transmits the serialized the data of the first symbol to the first lane LANE0. The serialized data of the first symbol may be transmitted to the second DSI 410 through the first lane LANE0.

The second symbol S2 is transmitted in a 3-byte PPI processing unit to the second SerDes 366-2 of the first D-PHY 366 through the first PPI 364. The second SerDes 366-2 serializes the data of the second symbol S2 and transmits the serialized data of the second symbol to the second lane LANE1. The serialized data of the second symbol may be transmitted to the second DSI 410 through the second lane LANE1.

The third symbol S3 is transmitted in a 3-byte PPI processing unit to the third SerDes 366-3 of the first D-PHY 366 through the first PPI 364. The third SerDes 366-3 serializes the data of the third symbol S3 and transmits the serialized data of the third symbol to the third lane LANE2. The serialized data of the third symbol may be transmitted to the second DSI 410 through the third lane LANE2.

The fourth symbol S4 is transmitted in a 3-byte PPI processing unit to the fourth SerDes 366-4 of the first D-PHY 366 through the first PPI 364. The fourth SerDes 366-4 serializes the data of the fourth symbol S4 and transmits the serialized data of the fourth symbol to the fourth lane LANE3. The serialized data of the fourth symbol may be transmitted to the second DSI 410 through the fourth lane LANE3. The lane distributor 362-3 may distribute the bytes BYTE0 through BYTE15 to the first through fourth lanes LANE0 through LANE3 using round-robin.

Figure 7:
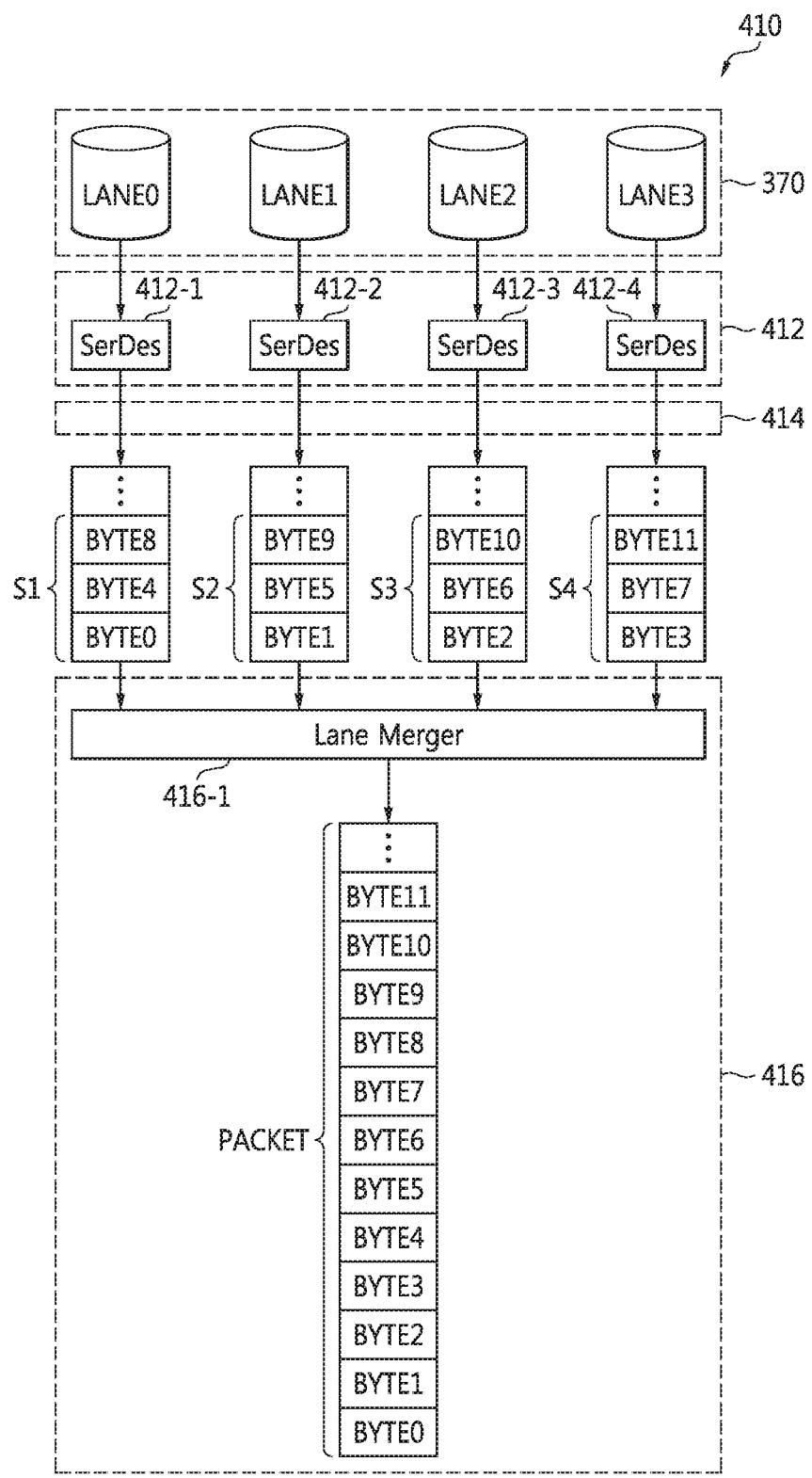
FIG. 7 is a conceptual diagram of the operation of the second DSI of the display driver IC illustrated in FIG. 1 according to other embodiments of the disclosure.

FIG. 7 is a conceptual diagram of the operation of the second DSI 410 of the DDI 400 illustrated in FIG. 1 according to other embodiments of the disclosure. Referring to FIG. 7, the fifth SerDes 412-1 may deserialize the serialized bytes BYTE0, BYTE4, BYTE8 received through the first lane LANE0 and may output the first symbol S1 to the lane merger 416-1 through the second PPI 414. The first symbol S1 may include the three bytes BYTE0, BYTE4, and BYTE8 which are packetized.

The sixth SerDes 412-2 may deserialize the serialized bytes BYTE1, BYTE5, and BYTE9 received through the second lane LANE1 and may output the second symbol S2 to the lane merger 416-1 through the second PPI 414. The second symbol S2 may include the three bytes BYTE1, BYTE5, and BYTE9 which are packetized.

The seventh SerDes 412-3 may deserialize the serialized bytes BYTE2, BYTE6, and BYTE10 received through the third lane LANE2 and may output the deserialized third symbol S3 to the lane merger 416-1 through the second PPI 414. The third symbol S3 may include the three bytes BYTE2, BYTE6, and BYTE10 which are packetized.

The eighth SerDes 412-4 may deserialize the serialized bytes BYTE3, BYTE7, and BYTE11 received through the fourth lane LANE3 and may output the fourth symbol S4 to the lane merger 416-1 through the second PPI 414. The fourth symbol S4 may include the three bytes BYTE3, BYTE7, and BYTE11 which are packetized.

The lane merger 416-1 may perform a merging operation on bytes respectively received from the lanes LANE0 through LANE3. Referring to FIG. 7, the order of the processing units BYTE0 through BYTE15 included in a data packet input to the first DSI 360 of the controller 300 is the same as the order of the processing units BYTE0 through BYTE15 included in a data packet output from the second DSI 410 of the DDI 400.

Therefore, even though the data width of the first PPI 364 of the first DSI 360 included in the controller 300 is different from that of the second PPI 414 of the second DSI 410 included in the DDI 400, that is, even though the PPIs 364 and 414 are asymmetrical; the second DSI 410 of the DDI 400 is able to exactly restore the data packet transmitted from the first DSI 360 of the controller 300.

Figure 8:
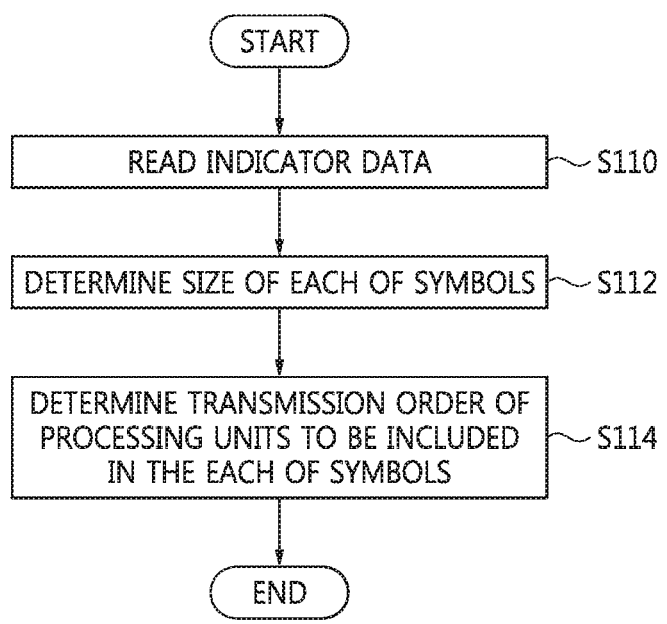
FIG. 8 is a flowchart of the operation of the DSI host controller illustrated in FIG. 2.

FIG. 8 is a flowchart of the operation of the DSI host controller 362 illustrated in FIG. 2. Referring to FIGS. 1 through 8, the lane distributor 362-3 receives the first indicator data CDATA from the register 362-1 in operation S110. The lane distributor 362-3 determines the size of each of symbols to be transmitted to the first PPI 364 based on the first indicator data CDATA in operation S112. The lane distributor 362-3 determines the order of first processing units to be included in the each of the symbols based on the first indicator data CDATA in operation S114. At this time, the lane distributor 362-3 may determine the order of the first processing units using Equation 1 or 2.

Figure 9:
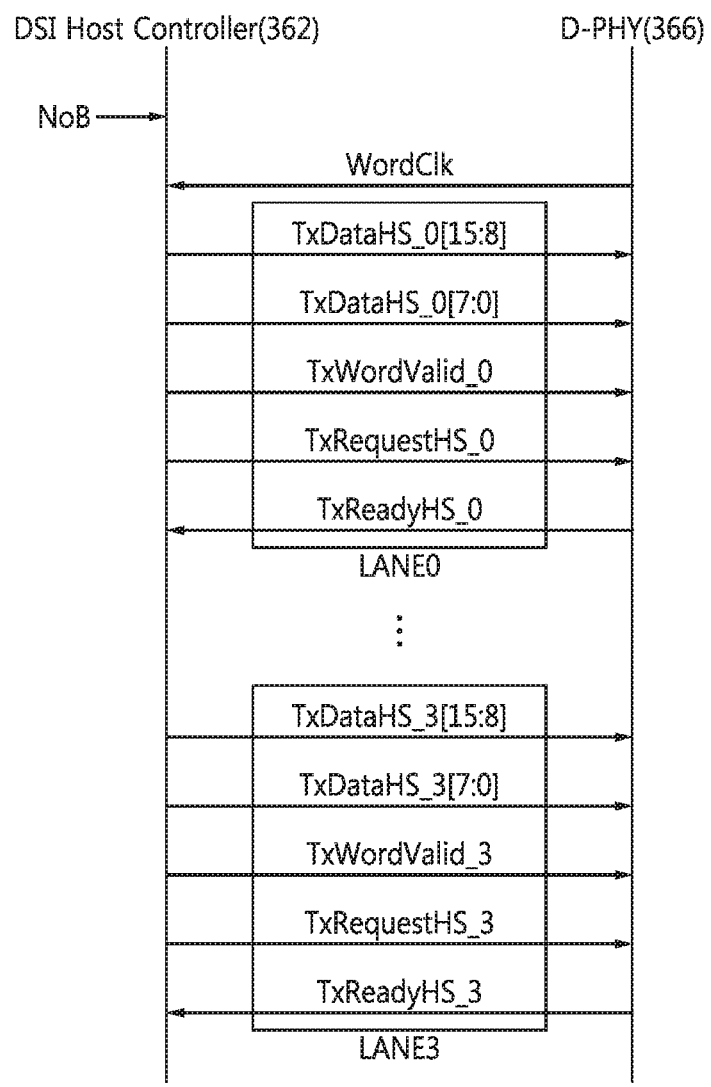
FIG. 9 is a diagram of signals transferred between the DSI host controller and a D-PHY in the first DSI of the controller according to some embodiments of the disclosure.

FIG. 9 is a diagram of signals transferred between the DSI host controller 362 and the first D-PHY 366 in the first DSI 360 of the controller 300 according to some embodiments of the disclosure. Referring to FIG. 9, the DSI host controller 362 may receive second indicator data NoB indicating the number of processing units included in a data packet and may generate indicator signals TxWordValid_0 through TxWordValid_3 each indicating that each of data to be transmitted to the first D-PHY 366 is valid.

In FIG. 9, a clock signal WordClk is a high-speed transmission byte clock signal and may be used as a common clock for the lanes LANE0 through LANE5. The DSI host controller 362 may transmit first high-speed transmission data TxDataHS_0[7:0] and second high-speed transmission data TxDataHS_0[15:8] to the first lane LANE0 in response to a rising edge of the clock signal WordClk.

It is assumed that the first high-speed transmission data TxDataHS_0[7:0] is least significant bits (LSBs) and the second high-speed transmission data TxDataHS_0[15:8] is most significant bits (MSBs) and that the size of each high-speed transmission data TxDataHS_0[7:0] or TxDataHS_0[15:8] is 1 byte. A symbol may include the first high-speed transmission data TxDataHS_0[7:0] and the second high-speed transmission data TxDataHS_0[15:8]. At this time, it is assumed that a datum TxDataHS_0[0] and a datum TxDataHS_0[8] are first transmitted.

When both LSB and MSB are valid, the indicator signal TxWordValid_0 is activated. In otherwise cases, the indicator signal TxWordValid_0 is deactivated. Here, it is assumed that activation is low-to-high transition and deactivation is high-to-low transition.

A transmission request signal TxRequestHS_0 indicates a request of a high-speed transmission. When the transmission request signal TxRequestHS_0 is activated, the first D-PHY 366 initiates a start-of-transmission sequence (SOT). When the transmission request signal TxRequestHS_0 is deactivated, the first D-PHY 366 initiates an end-of-transmission sequence (EOT).

A transmission ready signal TxReadyHS_0 indicates preparation of high-speed transmission. When the transmission ready signal TxReadyHS_0 is activated, the first D-PHY 366 may transmit the high-speed transmission data TxDataHS_0[7:0] and TxDataHS_0[15:8] in series.

The fourth lane LANE5 transmits high-speed transmission data TxDataHS_3[7:0] and TxDataHS_3[15:8], the indicator signal TxWordValid_3, and a transmission request signal TxRequestHS_3 to the first D-PHY 366 and transmits a transmission ready signal TxReadyHS_3 output from the first D-PHY 366 to the DSI host controller 362.

The first DSI 360 of the controller 300 needs to transmit only valid data to the second DSI 410 of the DDI 400. When the DSI device controller 416 of the DDI 400 de-packetizes received data (or received symbols), the DSI device controller 416 determines whether the received data (or the received symbols) are valid data using header information of a data packet and determines invalid data based on an EOT. When a valid EOT is not received, the DSI device controller 416 may operate abnormally. Since information about an EOT is generated by the first D-PHY 366 of the first DSI 360 in the controller 300, the DSI host controller 362 of the first DSI 360 should transmit only valid data to the first D-PHY 366.

When the size of a data packet is divisible by a PPI data width or when the number of all processing units included in a data packet is an even number, the DSI host controller 362 may transmit the indicator signals TxWordValid_0 through TxWordValid_3 each indicating that data (e.g., of two bytes) transmitted to the second DSI 410 of the DDI 400 is valid to the second DSI 410 of the DDI 400 during one cycle. However, when the size of the data packet is not divisible by the PPI data width or when the number of all processing units included in the data packet is an odd number, the DSI host controller 362 should not transmit dummy data among data transmitted to the second DSI 410 of the DDI 400 to the first D-PHY 366 during one cycle. When an odd number of processing units are transmitted to the second DSI 410 of the DDI 400 during one cycle, the DSI host controller 362 transmits the indicator signals TxWordValid_0 through TxWordValid_3 deactivated to the second DSI 410 of the DDI 400. The indicator signals TxWordValid_0 through TxWordValid_3 may indicate whether data transmitted to the respective lanes LANE0 through LANE5 are valid.

Figure 10:
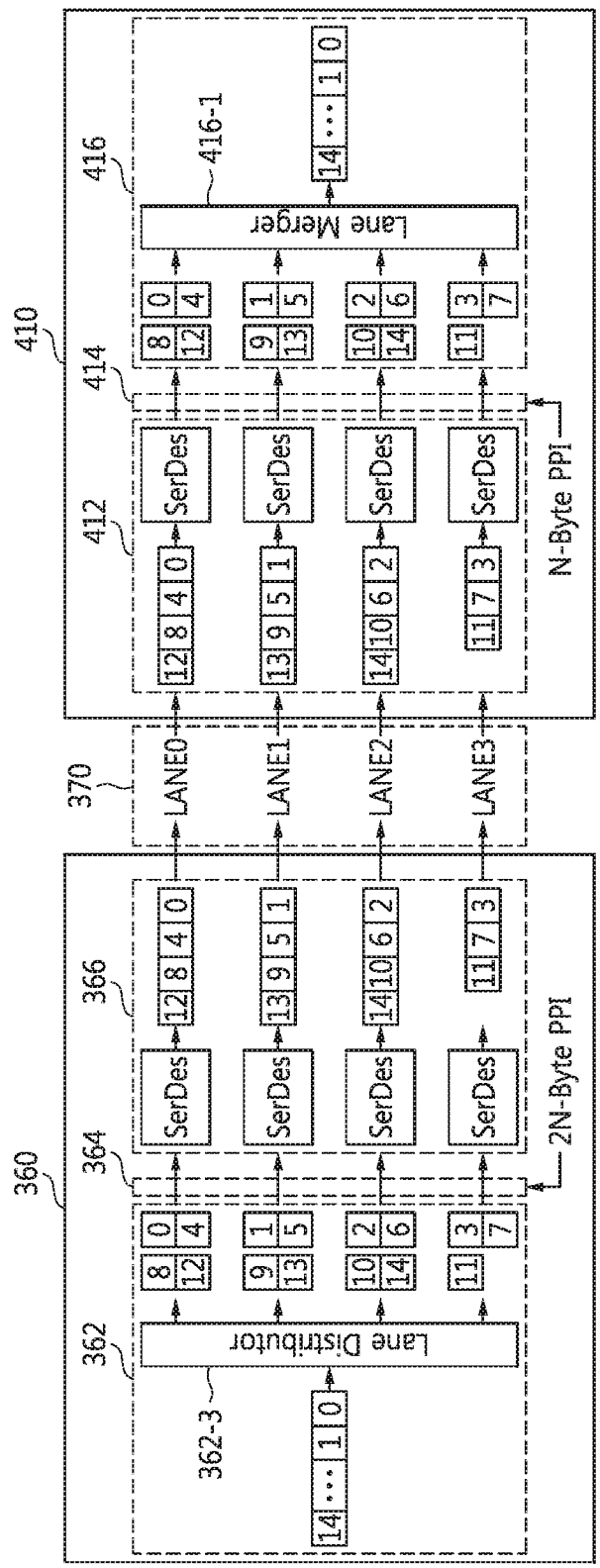
FIG. 10 is a diagram of the operations of the first DSI of the controller and the second DSI of the display driver IC which process an odd number of processing units according to some embodiments of the disclosure.
Figure 12:
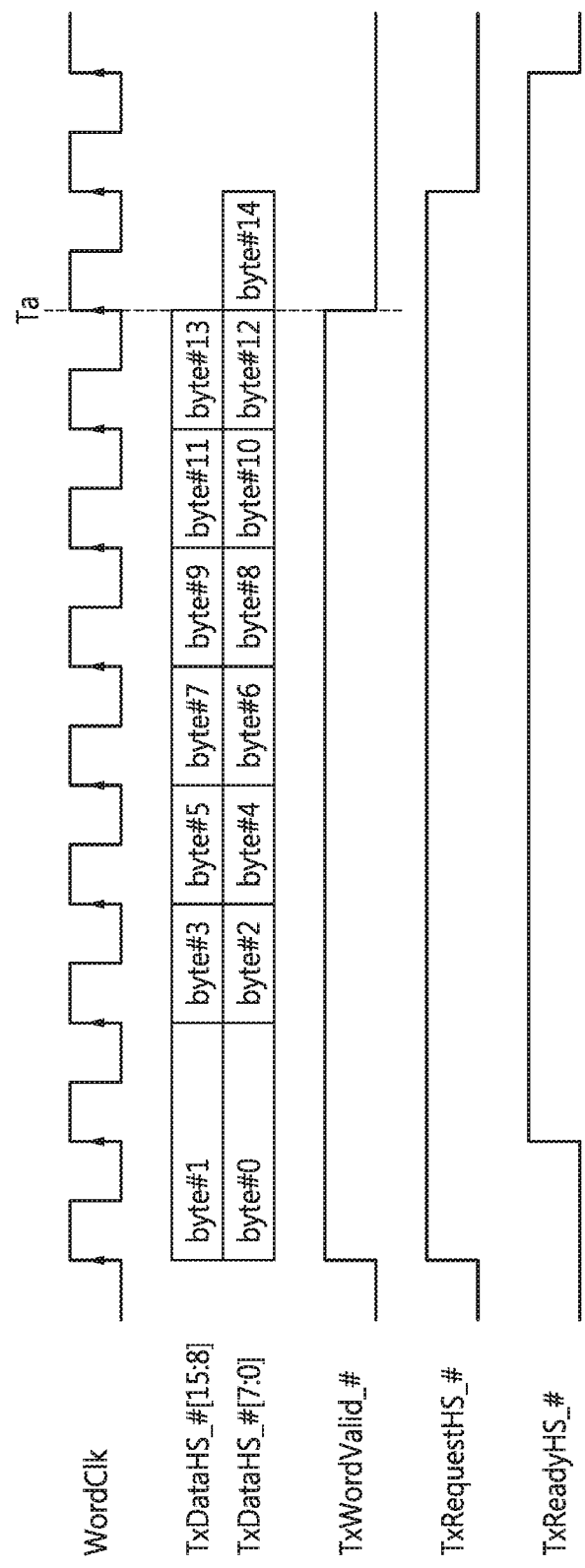
FIG. 12 is a conceptual diagram of a method of processing an odd number of processing units according to some embodiments of the disclosure.

FIG. 10 is a diagram of the operations of the first DSI 360 of the controller 300 and the second DSI 410 of the DDI 400 which process an odd number of processing units according to some embodiments of the disclosure. FIG. 12 is a conceptual diagram of a method of processing an odd number of processing units according to some embodiments of the disclosure.

When the second indicator data NoB indicating that the number of processing units included in a data packet is an odd number, e.g., 15 is input to the DSI host controller 362, the DSI host controller 362 may generate an indicator signal TxWordValid_# as shown in FIG. 12. The indicator signal TxWordValid_# collectively denotes at least one of the indicator signals TxWordValid_0 through TxWordValid_3.

Referring to FIGS. 10 and 12, when an even number (e.g., 2) of processing units is transmitted from the DSI host controller 362 to the first D-PHY 366 in each cycle, the DSI host controller 362 generates the indicator signal TxWordValid_# activated. However, when an odd number (e.g., 1) of processing units is transmitted from the DSI host controller 362 to the first D-PHY 366 in a particular cycle, the DSI host controller 362 generates the indicator signal TxWordValid_# deactivated. When the indicator signal TxWordValid_# is deactivated at a time point Ta, the first D-PHY 366 may determine that an LSB, i.e., byte #14 only is invalid in response to the indicator signal TxWordValid_# deactivated.

Figure 11:
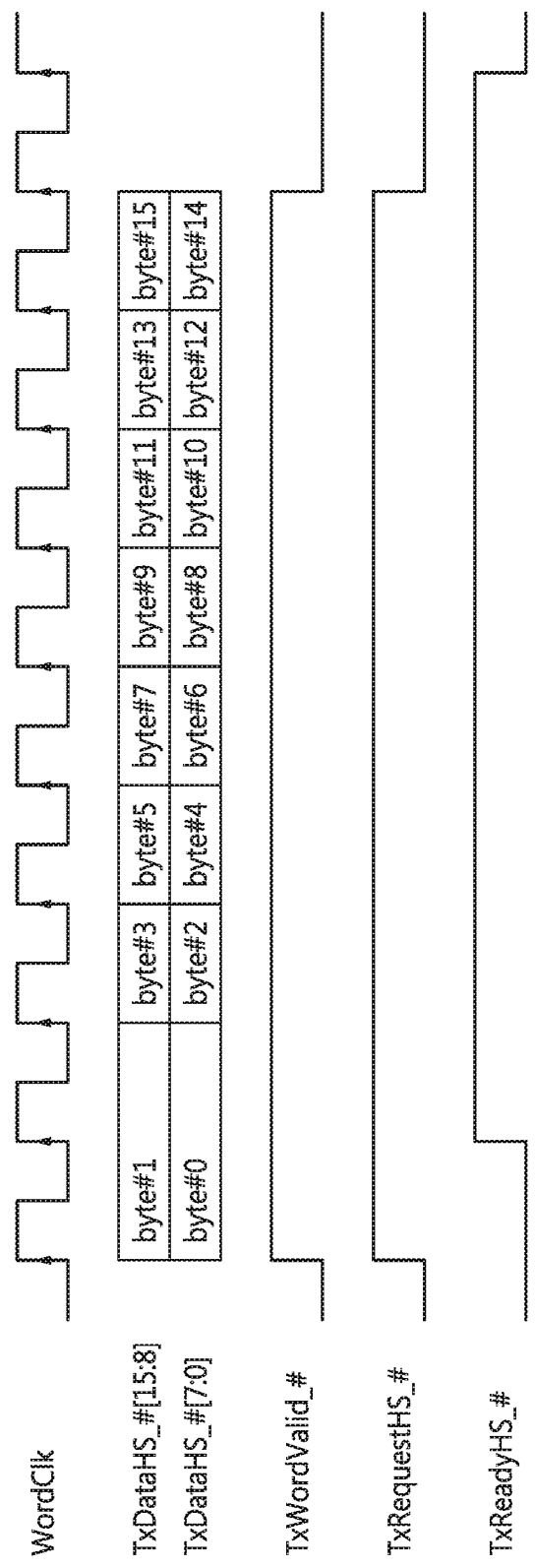
FIG. 11 is a conceptual diagram of a method of processing an even number of processing units according to some embodiments of the disclosure.

FIG. 11 is a conceptual diagram of a method of processing an even number of processing units according to some embodiments of the disclosure. Referring to FIGS. 5, 9, and 11, when the second indicator data NoB indicating that the number of processing units included in a data packet is an even number, e.g., 16 is input to the DSI host controller 362, the DSI host controller 362 may generate an indicator signal TxWordValid_# as shown in FIG. 11. Referring to FIG. 11, when an even number (e.g., 2) of processing units is transmitted from the DSI host controller 362 to the first D-PHY 366 in each cycle, the DSI host controller 362 generates the indicator signal TxWordValid_# activated.

Figure 13:
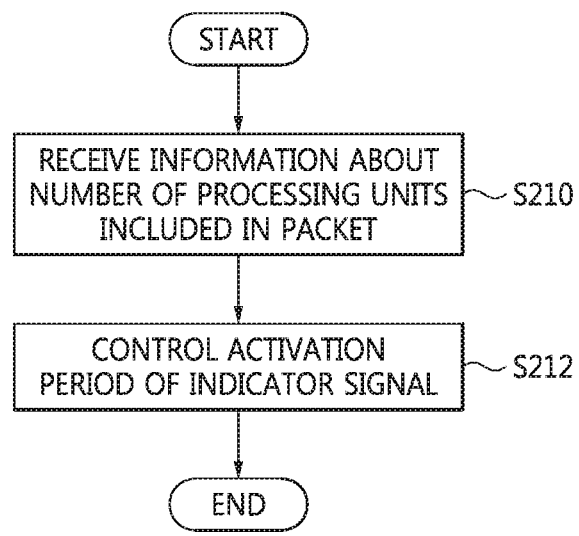
FIG. 13 is a flowchart of a method of operating a host controller illustrated in FIG. 10 according to some embodiments of the disclosure.

FIG. 13 is a flowchart of a method of operating the DSI host controller 362 illustrated in FIG. 10 according to some embodiments of the disclosure. Referring to FIGS. 9 through 13, the DSI host controller 362, and more particularly, the lane distributor 362-3 receives the second indicator data NoB indicating the number of processing units included in a data packet in operation S210. The DSI host controller 362 or the lane distributor 362-3 controls the activation period of the indicator signal TxWordValid_# indicating that at least one of processing units included in a symbol to be transmitted to the first D-PHY 366 is valid data in response to the second indicator data NoB, in operation S212.

When the number of processing units included in a symbol to be transmitted during a particular cycle is an even number, the lane distributor 362-3 generates the indicator signal TxWordValid_# activated. When the number of processing units included in a symbol to be transmitted during a particular cycle is an odd number, the lane distributor 362-3 generates the indicator signal TxWordValid_# deactivated.

When the number of processing units included in the data packet is an even number, the lane distributor 362-3 generates the indicator signal TxWordValid_# having a first activation period as shown in FIG. 11. However, when the number of processing units included in the data packet is an odd number, the lane distributor 362-3 generates the indicator signal TxWordValid_# having a second activation period as shown in FIG. 12. Referring to FIGS. 11 and 12, the first activation period is longer than the second activation period.

As described above, according to some embodiments of the disclosure, an SoC including a DSI determines the size of a symbol using indicator data indicating a PPI packetizing method, determines the order of processing units to be included in the symbol, and packetizes the symbol including the processing units distributed according to the order that has been determined. A DSI host controller of the DSI transmits a packetized multi-processing unit symbol to a D-PHY of the DSI, so that the data transmission speed of the SoC including the DSI increases and the power consumption of the SoC decreases.

Even though the data width of a PPI of the DSI in the SoC is different from the data width of a PPI of a DSI in a DDI connected to the SoC, the SoC is backward compatible with the DDI since the SoC transmits the symbol including the processing units distributed in the determined order to the DDI. Moreover, the DSI host controller controls the activation period of an indicator signal indicating that data (i.e., the symbol including the processing units distributed in the determined order) transmitted to the D-PHY is valid based on indicator data indicating the number of processing units included in a data packet, so that the SoC including the DSI host controller is backward compatible with the DDI connected to the SoC.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. A data processing system comprising:
   a register configured to provide first indicator data indicating a packetizing method; and
   a lane distributor configured to:
      packetize, based on the first indicator data, a first symbol and a second symbol to be transmitted to a PHY Protocol Interface (PPI),
      transmit a first indicator signal and the first symbol through a first lane of the PPI, the first indicator signal being associated with whether at least one first processing unit included in the first symbol is valid, and
      transmit a second indicator signal and the second symbol through a second lane of the PPI, the second indicator signal being associated with whether at least one second processing unit included in the second symbol is valid, wherein:
   the first indicator signal is activated while the first processing unit included in the first symbol is transmitted through the first lane, and
   the second indicator signal is activated while the second processing unit included in the second symbol is transmitted through the second lane.

2. The data processing system of claim 1, wherein the lane distributor is further configured to determine the first lane as a lane through which the first symbol is to be transmitted, based on the first indicator data.

3. The data processing system of claim 1, wherein the lane distributor is further configured to determine a number of lanes included in the PPI based on the first indicator data.

4. The data processing system of claim 3, wherein the lane distributor is further configured to determine transmission orders of the at least one first processing unit and the at least one second processing unit, based on the first indicator data.

5. The data processing system of claim 1, wherein the lane distributor is further configured to packetize the first symbol and the second symbol further based on second indicator data associated with a number of the at least one first processing unit and a number of the at least one second processing unit.

6. The data processing system of claim 1, wherein:
   the first indicator signal has a first state during a first time period, in a case where a number of the at least one first processing unit is even, and
   the first indicator signal has the first state during a second time period and the first indicator signal has a second state during a third time period after the second time period, in a case where a number of the at least one first processing unit is odd.

7. The data processing system of claim 6, wherein the first time period is longer than the second time period.

8. The data processing system of claim 1, wherein the lane distributor is further configured to receive a data packet and second indicator data from a Display Serial Interface (DSI) host controller.

9. The data processing system of claim 8, wherein the data packet includes the at least one first processing unit and the at least one second processing unit.

10. The data processing system of claim 8, wherein the lane distributor is further configured to obtain a number of processing units included in the data packet, based on the second indicator data.

11. A data processing system comprising:
   a lane distributor configured to:
      receive processing units in a data packet from a DSI host controller,
      determine a number of the processing units, transmission orders of the processing units, and a number of a plurality of lanes through which the processing units are to be transmitted, based on first indicator data, and
      packetize the processing units based on the transmission orders of the processing units; and
   a PHY interface circuit configured to receive the packetized processing units from the lane distributor through the plurality of lanes, wherein:

the PHY interface circuit is further configured to transmit indicator signals through a corresponding lane of the plurality of lanes, the indicator signals being associated with whether the packetized processing units are valid, and the indicator signals are activated while the packetized processing units are transmitted through the corresponding lane.

12. The data processing system of claim 11, one of the indicator signals is activated longer than another of the indicator signals, based on the number of the processing units and the number of the plurality of lanes.

13. The data processing system of claim 11, wherein the PHY interface circuit comprises a serializer/deserializer (SerDes) configured to serialize the processing units.

14. A data processing system comprising:
a PHY interface circuit configured to:
receive at least one first processing unit and a first indicator signal through a first lane of a plurality of lanes, the first indicator signal being associated with whether the at least one first processing unit is valid, and
receive at least one second processing unit and a second indicator signal through a second lane of the plurality of lanes, the second indicator signal being associated with whether the at least one second processing unit is valid; and a lane merger configured to merge the at least one first processing unit and the at least one second processing unit received from the PHY interface circuit through a PPI, wherein:

the at least one first processing unit and the at least one second processing unit are respectively associated with a first symbol and a second symbol which have been packetized based on a number of the plurality of lanes, sizes of the first symbol and the second symbol, and transmission orders of the first symbol and the second symbol, and the first indicator signal is activated during a time period, and after the time period the first indicator signal is deactivated, in a case where the at least one first processing unit is invalid.

15. The data processing system of claim 14, wherein the PHY interface circuit comprises a SerDes configured to deserialize the at least one first processing unit to generate a third symbol corresponding to the first symbol.

16. The data processing system of claim 14, wherein a number of lanes included in the PPI is smaller than the number of the plurality of lanes.

17. The data processing system of claim 14, the plurality of lanes is between the PHY interface circuit and a controller packetizing the first symbol and the second symbol.

* * * * *